United States Patent
Mok et al.

(10) Patent No.: US 9,276,882 B2
(45) Date of Patent: Mar. 1, 2016

(54) SYSTEM AND METHOD FOR ONLINE FAN MEETING

(71) Applicant: NHN Corporation, Seongnam-si (KR)

(72) Inventors: KyungTae Mok, Seongnam-si (KR);
Sungwon Jung, Seongnam-si (KR);
YeongMin Choi, Seongnam-si (KR); Ho Sung Kang, Seongnam-si (KR); Seok Hyun Jeong, Seongnam-si (KR);
Bohyun Oh, Seongnam-si (KR)

(73) Assignee: NHN Corporation, Gyeonggi-Do (KR)

( * ) Notice: Subject to any disclaimer, the term of this patent is extended or adjusted under 35 U.S.C. 154(b) by 432 days.

(21) Appl. No.: 13/793,527

(22) Filed: Mar. 11, 2013

(65) Prior Publication Data

US 2014/0149522 A1    May 29, 2014

(30) Foreign Application Priority Data

Nov. 27, 2012 (KR) ........................ 10-2012-0135015

(51) Int. Cl.
*H04L 12/58* (2006.01)
*H04L 29/08* (2006.01)

(52) U.S. Cl.
CPC .............. *H04L 51/04* (2013.01); *H04L 51/043* (2013.01); *H04L 67/24* (2013.01); *H04L 2209/603* (2013.01)

(58) Field of Classification Search
CPC ....... H04L 51/04; H04L 51/043; H04L 67/24; H04L 2209/603
See application file for complete search history.

(56) References Cited

U.S. PATENT DOCUMENTS

| | | | |
|---|---|---|---|
| 6,480,885 B1* | 11/2002 | Olivier ........................ | 709/207 |
| 2001/0034610 A1* | 10/2001 | Black .............................. | 705/1 |
| 2004/0205134 A1* | 10/2004 | Digate et al. .................. | 709/206 |
| 2007/0239819 A1* | 10/2007 | Woods et al. ................. | 709/201 |
| 2010/0127921 A1* | 5/2010 | Chen et al. ................. | 342/357.07 |
| 2010/0191811 A1* | 7/2010 | Yang et al. .................... | 709/206 |
| 2012/0004940 A1* | 1/2012 | O'Sullivan et al. .......... | 705/7.19 |
| 2012/0196267 A1* | 8/2012 | Hur .............................. | 434/353 |
| 2013/0262599 A1* | 10/2013 | Lee ............................... | 709/206 |
| 2014/0040360 A1* | 2/2014 | Privat ............................ | 709/204 |

FOREIGN PATENT DOCUMENTS

KR    10-2007-0031099    3/2007

* cited by examiner

*Primary Examiner* — Michael C Lai

(74) *Attorney, Agent, or Firm* — Harness, Dickey & Pierce, P.L.C.

(57) ABSTRACT

Provided are a system and a method for an online fan meeting. The online chat method among a first user and a plurality of second users, includes granting a bilateral chat right to a first group of users selected from the second users for participating in an online chat with the first user, authorizing an online chat communication among the first user and the first group based on the bilateral chat right, and broadcasting the online chat communication to a second group of users selected from the second users. The second group is granted with a unilateral chat right.

23 Claims, 8 Drawing Sheets

SYSTEM AND METHOD FOR ONLINE FAN MEETING

CROSS-REFERENCE TO RELATED APPLICATIONS

This application claims priority from and the benefit of Korean Patent Application No. 10-2012-0135015, filed on Nov. 27, 2012, which is hereby incorporated by reference for all purposes as if fully set forth herein.

BACKGROUND

1. Field

Exemplary embodiments of the present invention relate to a system and a method for providing a meeting service using an online chat service.

2. Discussion of the Background

Generally, a messenger program relates to a communication tool that enables real-time transmission and reception of messages or data through software installed on a user terminal. A typical messenger program allows a user to register a chat partner and to exchange messages with chat partners included in a contact list, in real time.

Korean Patent Application Publication No. 10-2007-0031099, published on Mar. 19, 2007, discloses a method for offering a chat service in an instant messenger program of a mobile communication terminal. Messenger programs are widely adopted not only in a personal computer (PC) but also in a mobile communication terminal, such as a smartphone, tablet computer, and the like.

In order to hold a fan meeting for fans of a public figure or celebrity, for example, an actor, an actress, an athlete, and a singer, a location capable of accommodating a great number of fans and a considerable period of time are needed.

Thus, there is a need for a fan meeting service that can be provided without constraints of a set location or time.

SUMMARY

Exemplary embodiments of the present invention provides an online fan meeting service implemented to meet needs for a fan meeting without constraints of a set location or time. Exemplary embodiments of the present invention provide a system and method for an online fan meeting, which provides a fan meeting forum using an online chat service.

Exemplary embodiments of the present invention also provide a system and method for an online fan meeting capable of accommodating a great number of participants with enhanced autonomy and freedom of an online chat for a fan meeting.

Exemplary embodiments of the present invention also provide a system and method for an online fan meeting in which a concept of chat participation rights is introduced to secure smooth chat management and communication speed.

Additional features of the invention will be set forth in the description which follows, and in part will be apparent from the description, or may be learned by practice of the invention.

An exemplary embodiment of the present invention discloses an online chat method that uses a processor to provide an online communication among a first user and a plurality of second users, the method including: granting, using the processor, a bilateral chat right to a first group of users selected from the second users for participating in an online chat with the first user; authorizing an online chat communication among the first user and the first group based on the bilateral chat right; and broadcasting the online chat communication to a second group of users selected from the second users, the second group being granted with a unilateral chat right. The granting of the chat participation rights divides the plurality of second users into the first group having at least a right, among rights granted to the first user in the chat, to send a message, and the second group lacking at least a right to send a message.

An exemplary embodiment of the present invention discloses an online chat system to provide an online chat communication among a first user and a plurality of second users, the system including: a storage device; a server module stored on the storage device and configured to grant a bilateral chat right to a first group of users selected from the second users for participating in an online chat with the first user, and configured to authorize an online chat communication among the first user and the first group based on the bilateral chat right. The server module includes a message receiver configured to receive chat messages from the first user and the first group, and a message broadcaster configured to transmit the chat messages to a second group of users selected from the second users, the second group being granted with a unilateral chat right.

An exemplary embodiment of the present invention discloses a method that uses a processor to participate in an online chat communication with a first user, the method including: transmitting a request for participating in an online chat communication with the first user; receiving a chat participation right for the online chat communication in response to the request; and establishing, using the processor, a bilateral chat communication or a unilateral chat communication with the first user based on a type of the chat participation right.

An exemplary embodiment of the present invention discloses a non-transitory computer-readable recording medium including an executable program for instructing a computer, when executed by the computer, to perform: transmitting a request for participating in an online chat communication with the first user; receiving a chat participation right for the online chat communication in response to the request; and establishing, using the processor, a bilateral chat communication or a unilateral chat communication with the first user based on a type of the chat participation right.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
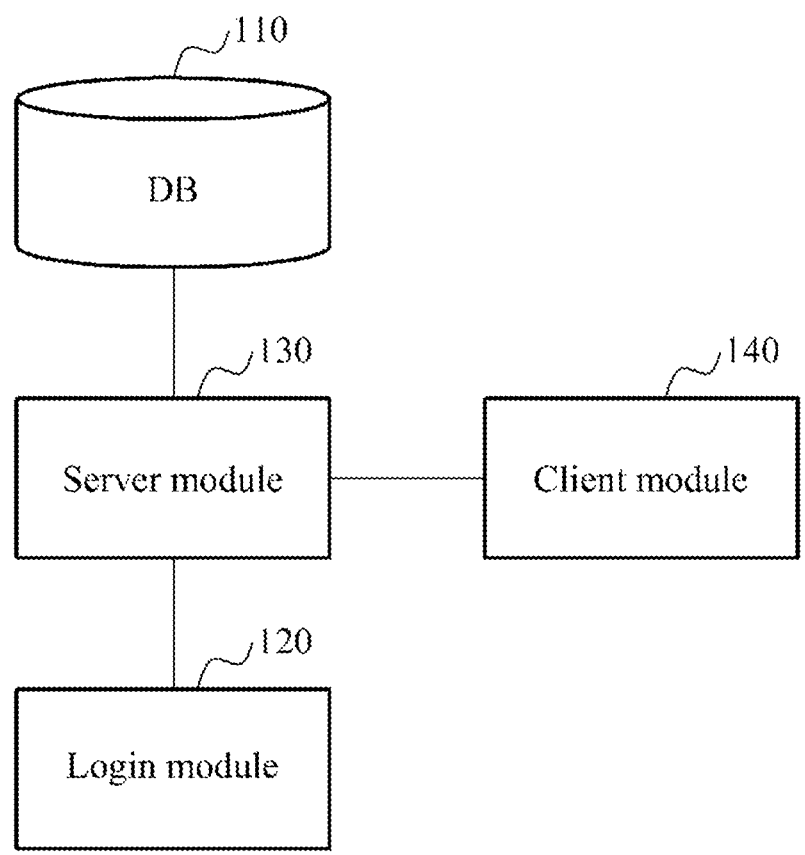
FIG. 1 illustrates a configuration of an online chat system for a fan meeting according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that for the purposes of this disclosure, "at least one of" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, XZZ, YZ, X).

Exemplary embodiments of the present invention relate to a chat service model enabling one-to-many or many-to-many message transmission and reception through a communication tool, such as a messenger. Hereinafter, a system and method for supporting a fan meeting using an online chat through a messenger will be described in detail. However, the present invention is not limited thereto but may be applied to various chat service models or messenger programs.

FIG. 1 illustrates a configuration of an online chat system for a fan meeting according to an exemplary embodiment of the present invention. However, aspects of the present invention are not limited to a fan meeting, but applicable to various types of multi-user communications, such as online multi-user meetings and online multi-user communication services provided based on wired/wireless communication connections.

As shown in FIG. 1, the online chat system may include a database (DB) 110, a login module 120, a server module 130, and a client module 140. A server (not shown) may include the login module 120 and the server module 130. A user terminal (not shown) may include the client module 140. The database 110 may be included in the server or may be connected with the server via a wired or wireless connection.

The database 110 may serve to store and retain transmitted and received messages exchanged through a chat room for a fan meeting.

The login module 120 may serve to accept user access to a chat for a fan meeting through user authentication. The login module 120 may include a login interface (not shown) for processing login attempts from client modules 140 installed in terminals of the celebrity and a plurality of users and an authentication module (not shown) to authenticate each login attempt. The authentication module may authenticate each user and identify the celebrity from general users by verifying identification of the celebrity.

The server module 130 may serve not only to generate a chat room for a fan meeting and transmit and receive chat messages between a celebrity and a user, but also to authorize a user to participate in the chat room and controls over user entrance to the chat room. The login module 120 and the server module 130 may be implemented by hardware components included in one or more servers, such as one or more processors, a storage device, one or more memories, communication devices and interfaces, and the like, and the database 110 may be implemented by a storage device included in one or more servers or other external storage devices, e.g., cloud data servers.

The client module 140 may serve to retrieve and display (hereinafter, "read") the transmitted and received messages exchanged between the celebrity and the user through the chat room and to receive an input (hereinafter, "write") of a chat message from the celebrity and the user. Further, the client module 140 may provide a function of transmitting a user intent to participate in a chat for a fan meeting. The client module 140 having such functions may be activated in a local device of the celebrity or the user, such as a personal computer (PC) or a mobile terminal, and may include a PC-based application or a dedicated application for a mobile terminal. That is, the client module 140 may perform general operations of a messenger for an online chat, for example, configuring a messenger screen, inputting data, transmitting and receiving data, and storing data, under control of the server module 130. Further, the client module 140 may provide a login interface in conjunction with the login module 120. The client module 140 may be a software component that can be installed in a storage device of a user terminal, and may be executed by one or more processors of the user terminal. In the present disclosure, the online chat may include various kinds of communications among users of computing terminals, such as a smartphone, a personal computer, and the like, and the connections among the terminals may be implemented via various types of networks including mobile wireless communication networks, Wi-Fi networks, wired Internet connections, and the like. Thus, the terms, "online" and "online chat", are not limited to wired online connection. Accordingly, wireless connections among computing terminals are also included in the "online" connections for online chat methods described in the present disclosure.

Thus, for an online chat of a fan meeting service, PC web or mobile application-based chat technologies may be applied and techniques for dispersing a load to a chat client to accommodate a great number of fans, and a new concept of a right to participate in a chat to secure smooth chat management and a chat speed are introduced.

According to the preceding configuration, the server module 130 may generate a chat room for a fan meeting using a celebrity account based on a celebrity request and enables messages to be exchanged between a participant user and the celebrity through the chat room.

For example, the sever module 130 may generate a chat room for a fan meeting using an official account for a fan meeting. Here, the official account may provide various types of information about a celebrity, such as an actor, a sports player, and a singer, on the messenger and be made publicly available or recommended to all messenger users. Further, official accounts may be accounts that are automatically recommended to messenger users based on predetermined conditions for the accounts to be added as chat partners by the users. For example, an official account may be an account recommended to users satisfying certain demographic conditions, e.g., age and gender, or an account recommended to users who input a code obtained through various online and offline channels.

FIG. 2, FIG. 3, FIG. 4, and FIG. 5 are diagrams of application screens illustrating a route for participating in a fan meeting service according to an exemplary embodiment of the present invention. For instance, referring to FIG. 2, the server module 130 may provide an account list of a celebrity (hereinafter, "fan meeting list") to have a fan meeting through a user client module 140. As an example, when the celebrity registers information about fan meeting to be held, for example, a fan meeting time and details about the fan meeting to be held, in advance through the client module 140 of the corresponding celebrity, the server module 130 may activate and provide an official account of the celebrity on the fan meeting list. In this example, the fan meeting list may be arranged and displayed in the order of names, popularity, or fan meeting times. Further, the fan meeting list may be arranged for a client module of each mobile communication terminal according to a user preference. For example, a mobile communication terminal may store information associated with user preference for specific celebrities. The user preference information for a specific celebrity may be obtained based on user's web usage log, messenger service usage log, and other user information (e.g., a downloaded photograph of a celebrity, a music file of a celebrity stored in the mobile communication terminal of the user, and the like).

Figure 3:
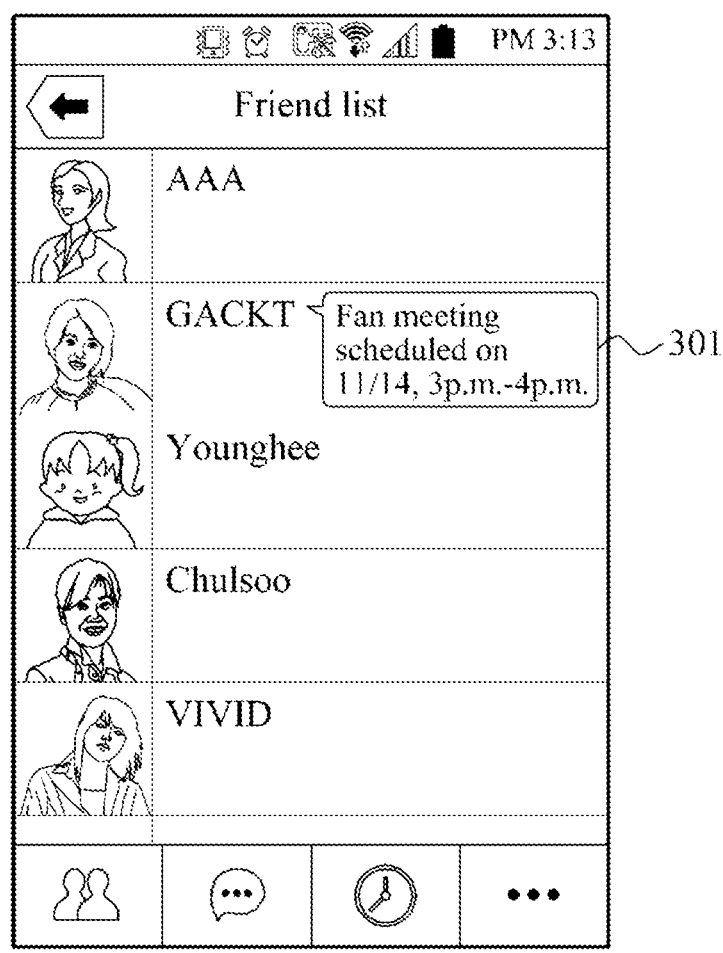
Figure 4:
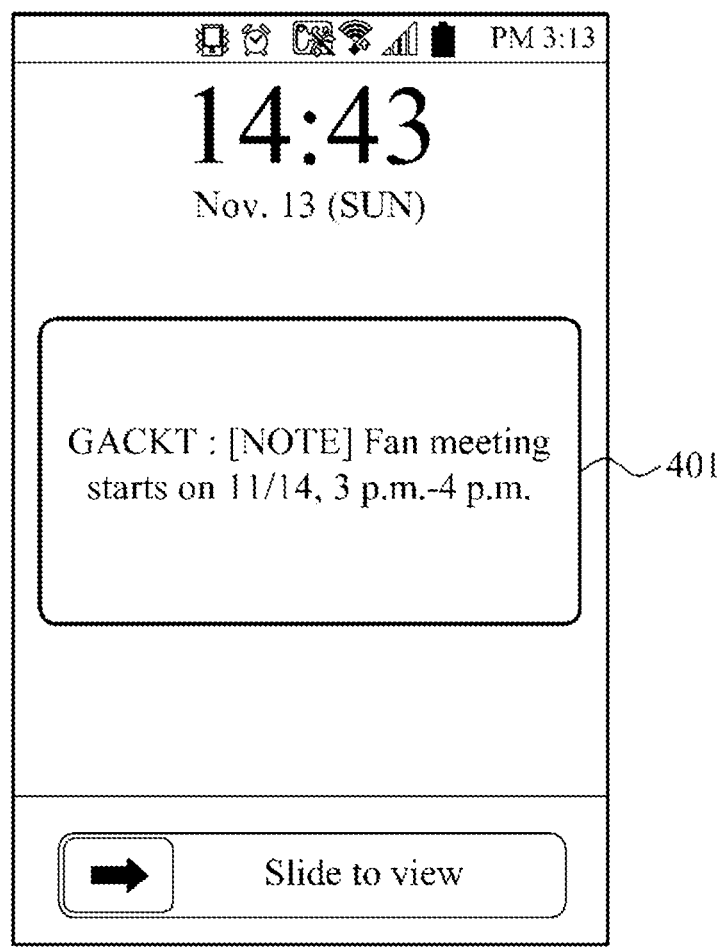

Further, referring to FIG. 3, when an account of a celebrity registering fan meeting information is registered in a friend list of a user, the server module 130 may activate the account of the celebrity through a friend list screen 310 and provide fan meeting information 301 in association with the item corresponding to the account of the celebrity. Further, if the account of the celebrity is registered in the friend list of the user, as shown in FIG. 4, the server module 130 may provide fan meeting information with a pop-up notification 401 at a time of the fan meeting information being registered or a certain period of time before a scheduled fan meeting time. The celebrity may be a plurality of celebrities in a group, e.g., a rock band, or more than one celebrity may join in a joint fan meeting. Then, multiple celebrities may be granted with bilateral chat rights and communicate with fan meeting participants in one chat room.

The server module 130 may grant a bilateral chat right enabling bilateral communication with a celebrity to at least one user among a number of users that have indicated an intent to participate in a fan meeting with the celebrity. The bilateral chat right includes at least a right to send a message to the celebrity among rights granted to the celebrity in the chat (hereinafter, the users granted with the bilateral chat right is referred to as "fan meeting participants"). Remaining users who are not authorized for the bilateral chat right may not be allowed to send a message to the celebrity (hereinafter, the remaining users are referred to as "fan meeting observers"). Specifically, a fan meeting participant may be given both a right to read a chat message, which is a right to receive a message, and a right to write a message, which is a right to send a message if the bilateral chat right has been granted. A fan meeting observer may be given a right to read a message without being given a right to write a message. In other words, the fan meeting observer may be granted with a unilateral chat right to receive messages communicated among the celebrity and the fan meeting participants and/or messages sent from the celebrity. Further, the fan meeting participant may be given a right to playback or download contents, for example, music and images, sent by a celebrity during a fan meeting through a chat, while the fan meeting observer may not be allowed to play back or download such contents.

Figure 5:
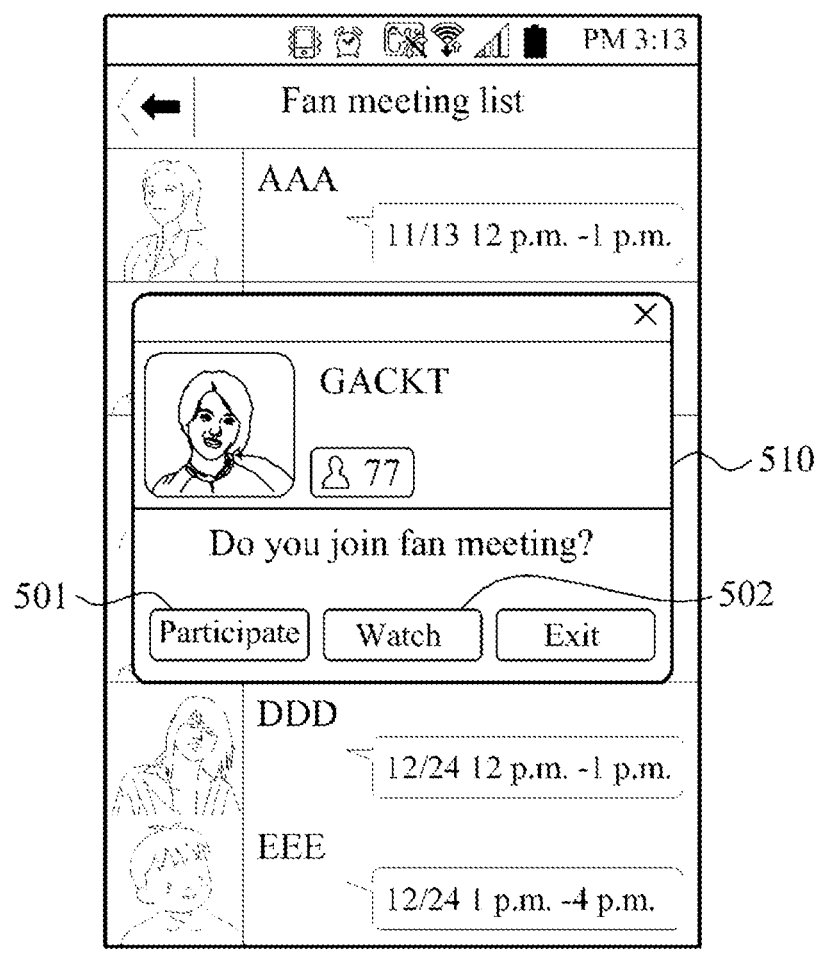

The server module 10 may receive an intention of a user to participate in a fan meeting through the client module 140 of the user, and distinguish fan meeting participation types. For example, if a user selects a particular celebrity account from the fan meeting list of FIG. 2 or the friend list of FIG. 3, the client module 140 may display a pop-up window 510 for inputting a decision on participation type in the fan meeting, as shown in FIG. 5. Here, the pop-up window 510 may activate a 'participate' button 501 to input a selection for a fan meeting participant and a 'watch' button 502 to input a selection for a fan meeting observer. Thus, the server module 130 may receive different types of participation requests and distinguish a fan meeting participant, who may participate in the fan meeting and send a message to the celebrity, from a fan meeting observer, who may participate in the fan meeting by watching the fan meeting without being able to send a message to the celebrity.

In another aspect of the present invention, the server module 130 may receive participation requests from users for participating in a fan meeting through the client module 140 irrespective of fan meeting participation types, and determine a predetermined number of the users to be fan meeting participants having a right to send a message to a celebrity and the other users as fan meeting observers based on a random selection or a first-come first-served basis. Further, the server module 130 may send quizzes about the celebrity and receive answers from the users. The selection of the fan meeting participants may be selected based on the score for the quizzes and/or other criteria.

The server module 130 may collect requests from users for participating in a fan meeting through the client module 140 irrespective of fan meeting participation types, and determine a number of the users satisfying certain conditions as fan meeting participants and remaining users as fan meeting observers. For example, users satisfying demographic conditions, for example, age and gender, or users inputting a code obtained through various online or offline channels may be determined to be fan meeting participants. For example, if a user purchases digital content of the celebrity via online content providing platforms, a code, e.g., a QR code, may be provided for participation in a fan meeting service with the celebrity.

The server module 130 may define an identifier to distinguish a fan meeting participant from a fan meeting observer and transmit the identifier to the client module 140 of each user. Accordingly, the client module 140 of each user may identify a right of the user through the identifier. According to the type of the identifier, both functions of reading and writing a chat message may be activated, or a read function may be activated without a write function.

As described above, a concept of an observer not allowed to perform other functions other than a limited function, e.g., a message reception function may be implemented, thereby accommodating a large number of fans, maintaining smooth chat management, and satisfying different needs of users. Some fans may want to participate in the fan meeting service as active participants for chatting with a celebrity, such as interested persons and reporters, and some fans who wish to participate in a fan meeting may not wish to send a message.

Figure 6:
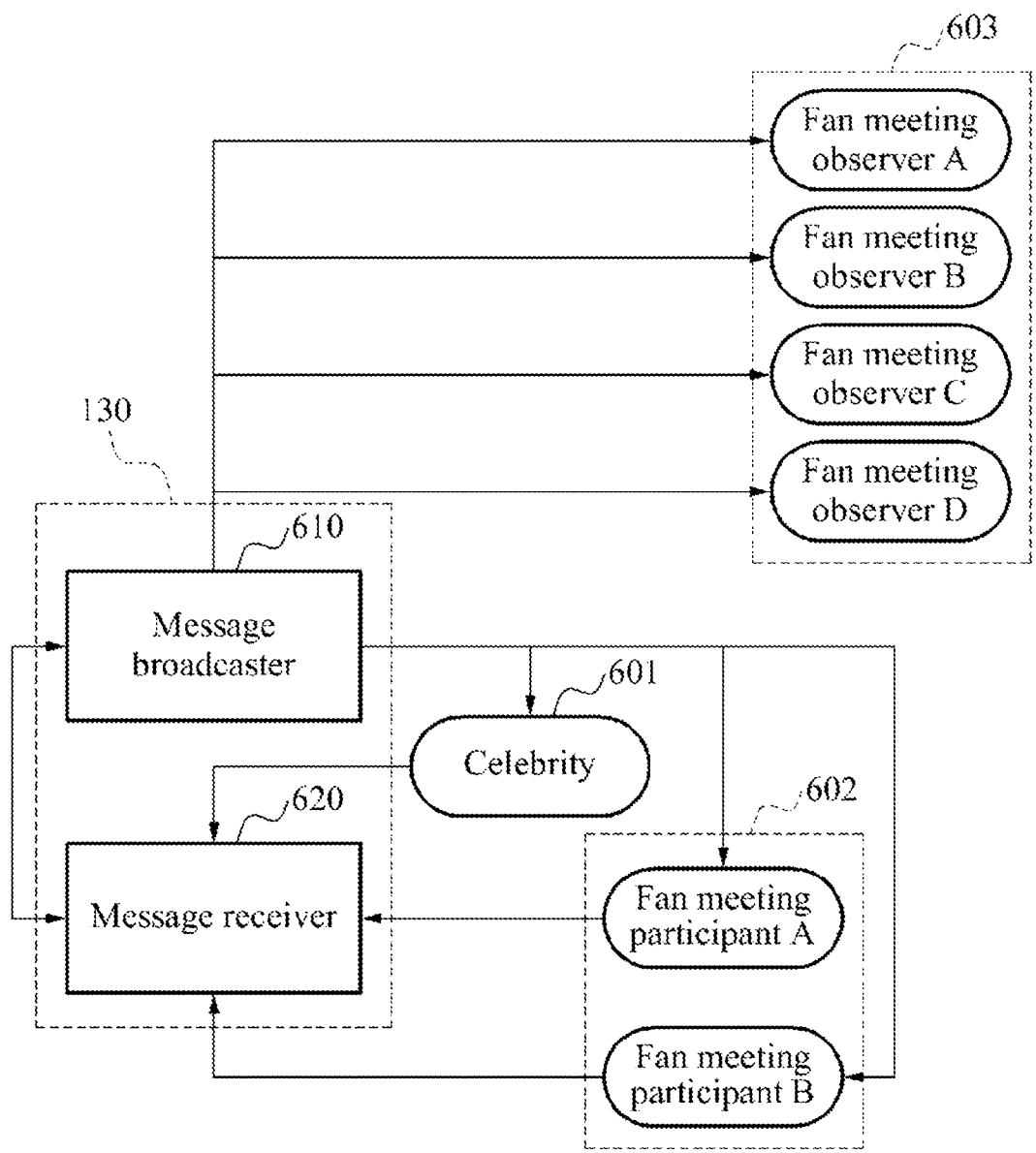
FIG. 6 illustrates a system for a chat message transmission and reception for a fan meeting according to an exemplary embodiment of the present invention.

FIG. 6 illustrates a system for a chat message transmission and reception for a fan meeting according to an exemplary embodiment of the present invention.

As shown in FIG. 6, the server module 130 may include a message broadcaster 610 and a message receiver 620. A server (not shown) may include one or more processors, a storage device, a wired/wireless communication device, and other peripheral devices. The server module 130 included in the server may be a software module stored in the storage device and configured to be executed by the one or more processors. Alternatively, the server module 130 may be implemented to include hardware and software components to perform illustrated operations and functions. The message broadcaster 610 may include hardware and software components to transmit messages received from a terminal of a celebrity 601 ("celebrity 601") and terminals of fan meeting participants 602 ("fan meeting participants 602"). The messages may be stored in a database included in the server or a database connected to the server via a communication interface by the message receiver 620, and may be transmitted to the celebrity 601, the fan meeting participants 602, and fan meeting observers 603. The message receiver 620 may include hardware and software components to receive messages from the celebrity 601 and the fan meeting participants 602 and to store the messages in the database included in the server or the database connected to the server via a communication interface. Alternatively, the message broadcaster 610 and the message receiver 620 may be a software module including program instructions to implement such operations in conjunction with one or more processors, a storage device, a database storing messages received from the celebrity 601 and the fan meeting participants 602, a wired/wireless communication device, and other peripheral devices.

The celebrity 601 and a plurality of fan meeting participants 602 are allowed to receive and send chat messages, while a plurality of fan meeting observers 603 are allowed to receive, but not send, chat messages.

Thus, the message broadcaster 610 may be configured to transmit a chat message to the celebrity 601, the plurality of fan meeting participants 602, and the plurality of fan meeting observers 603.

The message receiver 620 may be configured to receive chat messages from the celebrity 601 and the plurality of fan meeting participants 602, but not from the plurality of fan meeting observers 603.

With this configuration, the message receiver 620 receives messages sent by the celebrity 601 and the plurality of fan meeting participants 602 and transmits the messages to the message broadcaster 610, and the message broadcaster 610 transmits the received messages to the celebrity 601, the plurality of fan meeting participants 602, and the plurality of fan meeting observers 603.

Thus, in the message transmission and reception architecture, the plurality of fan meeting observers 603 may view chat messages exchanged between the celebrity 601 and the plurality of fan meeting participants 602, but may not be allowed to send a message to the celebrity 601 or the plurality of fan meeting participants 602.

Moreover, the message receiver 620 may check whether the celebrity 601 and the plurality of fan meeting participants 602 receive a chat message, for example, read the chat message, through client modules of the celebrity 601 and the plurality of fan meeting participants 602.

For example, the message receiver 620 verifies whether a chat message is read by the celebrity 601 and the plurality of fan meeting participants 602 through the client modules of the celebrity 601 and the plurality of fan meeting participants 602, respectively, but does not verify whether the chat message is read by the plurality of fan meeting observers 603.

Here, the message receiver 620 may determine a current session count with respect to the celebrity 601 and the plurality of fan meeting participants 602 in real time and calculate a chat message read count, for example, a number of people failing to check the message among celebrities and fan meeting participants, using a ratio between the session count and an accumulated number of people checking the message. In particular, the message reception unit 620 may calculate a message check ratio, for example, the accumulated message check count/the session count, by comparing the accumulated message check count with the current session count in real time. The message receiver 620 may update the read count if the message check ratio reaches a predetermined level, and transmit the read count to the message broadcaster 610. The message broadcaster 610 may transmit the current read count to both the celebrity 601 and the plurality of fan meeting participant 602. Further, if a fan meeting participant fails to check a threshold number of messages, the fan meeting participant may lose the status and may be switched to a fan meeting observer. The message check count for the fan meeting participant may be used to determine whether the fan meeting participant fails to check the threshold number of messages in a certain time period. If one or more fan meeting participants lose their status, the vacant slots may be filled with other fan meeting observers. For example, if two fan meeting participants lose their status, two fan meeting observers may be selected based on certain criteria and may be switched to fan meeting participants.

As described above, the server module 130 may determine whether a chat message is read by the celebrity 601 and the plurality of fan meeting participants 602 and update the read count. However, the server module 130 may not determine whether the messages are read by the plurality of fan meeting observers 603.

In a conventional method, the read count is updated whenever each person reads a message, thus generating a load in both the message broadcaster 610 and the message receiver 620 and causing a lag as a number of users participating in a group chat increases. However, in the method of updating the read count without considering the fan meeting observers 603, the server module 130 does not check whether the plurality of fan meeting observers 603 read received messages. Because the read count generated by the fan meeting observers 603 is not essential, data traffic loads may be reduced. Further, the server module 130 calculates the message check ratio, for example, the accumulated message check count/the session count in real time, and transmits the read count if the message check ratio is higher than or equal to a predetermined level, thereby reducing the frequency of read count transmission and obtaining an additional reduction in data traffic loads.

Figure 7:
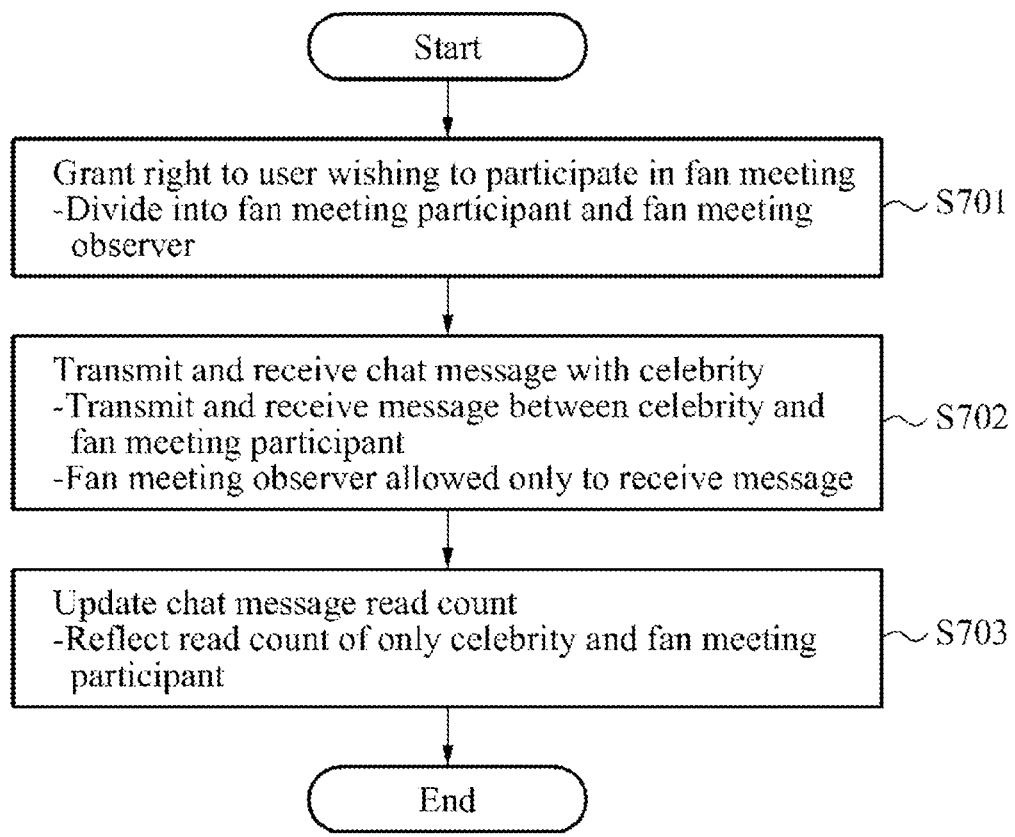
FIG. 7 is a flowchart illustrating an online chat method for a fan meeting according to an exemplary embodiment of the present invention.

FIG. 7 is a flowchart illustrating an online chat method for a fan meeting according to an exemplary embodiment of the present invention. FIG. 7 will be described as if performed by the online chat system shown in FIG. 1 through FIG. 6, but is not limited as such.

In operation S701, the online chat system may grant a right to participate in a chat for a fan meeting to a user wishing to participate in the chat. Here, the online chat system may provide a selected number of users indicating an intent to participate in the fan meeting with a celebrity with at least a right, among rights given in the chat, to send a message and may not allow the remaining users to have at least the right to send the message. For example, when a user indicates an intention to participate in the fan meeting, the user may indicate a participation type whether the participation will be as a fan meeting participant or a fan meeting observer. Accordingly, the online chat system may collect requests including the intent and distinguish a fan meeting participant, who may participate in the fan meeting and send a message to the celebrity, from a fan meeting observer, who may participate in the fan meeting to watch the fan meeting without the ability to send a message to the celebrity. Further, the online chat system may collect users participating in a fan meeting irrespective of fan meeting participation types, and determine a predetermined number of users from the applicants as fan meeting participants having a right to send a message to the celebrity and the remaining users as fan meeting observers based on a random selection or a first-come first-served basis. Further, the online chat system may collects users to participate in a fan meeting irrespective of fan meeting participation types, and determine a number of users satisfying set conditions from the applicants as fan meeting participants and the remaining users as fan meeting observers. For example, users satisfying certain demographic conditions, e.g., location, age, and gender, or users inputting a code obtained through various online or offline routes may be determined as fan meeting participants. Here, a chat application installed in a user terminal may check a chat participation right of a user and then activate both functions of reading and writing a chat message, or activate a read function and deactivate a write function. Further, the activation of the writing function may be controlled by a server, e.g., the server module 130, based on the selections of the fan meeting participants and the fan meeting observers.

In operation S702, the online chat system may transmit and receive a chat message between a user and a celebrity based on a chat participation right of each user. Here, the online chat system may transmit and receive a chat message between the celebrity and the user in a structure of receiving a chat message from the celebrity and a fan meeting participant and of transmitting the received chat message to not only the celebrity and the fan meeting participant but also a fan meeting observer. That is, the fan meeting participant is allowed to exchange a chat message with the celebrity, while the fan meeting observer is not allowed to send a message directly to the celebrity but enabled to receive a message exchanged between the celebrity and the fan meeting participant.

In operation S703, the online chat system may provide a read count of a chat message between the celebrity and the user. The read count may be referred to as a message check count. For example, the online chat system verifies whether chat messages are read by the celebrity and the fan meeting participants but may not verify whether the fan meeting observers read the chat messages. In other words, a message check of the fan meeting observer may not be counted or applied to the message check count. Here, the online chat system may determine a number of users checking the message, that is, an accumulated message check count, among the celebrity and the fan meeting participants and a current session count in real time, and update and transmit the message check count to the celebrity and the fan meeting participants if a ratio of the accumulated message check count to the session count is higher than or equal to a predetermined level.

According to the foregoing method, a fan meeting service using an online chat may be provided.

As described above, exemplary embodiments of the present invention provide a fan meeting service using an online chat through a messenger, thereby enabling participation of a greater number of people and without constraints of a set location and time for a fan meeting. Furthermore, a number of fan meeting participants are not allowed to send a message, thus a greater number of fans may be accommodated in an online fan meeting. Further, by restricting message sending functions for a number of fan meeting observers, a smooth chat management and a chat speed may be secured thereby improving free participation and autonomy of the fan meeting. In addition, an update of a message read count may be controlled for a group chat in an online chat for a fan meeting, thus a system load may be reduced.

A chat application activated in local devices of a celebrity and a user, for example, a personal computer (PC) and a mobile terminal, may include a client module to control the local devices to perform operations S701 to S703 described with reference to FIG. 7. The application may be provided by an application distribution system (not shown). For example, the application distribution system may include a file transmission unit (not shown) to transmit a file to install an application to the local devices of the celebrity and the user. The application may include a set of instructions stored in one or more storage devices of the local device. When executed by one more processors of the local device, the instructions may cause the local device to perform the functions described above.

Figure 8:
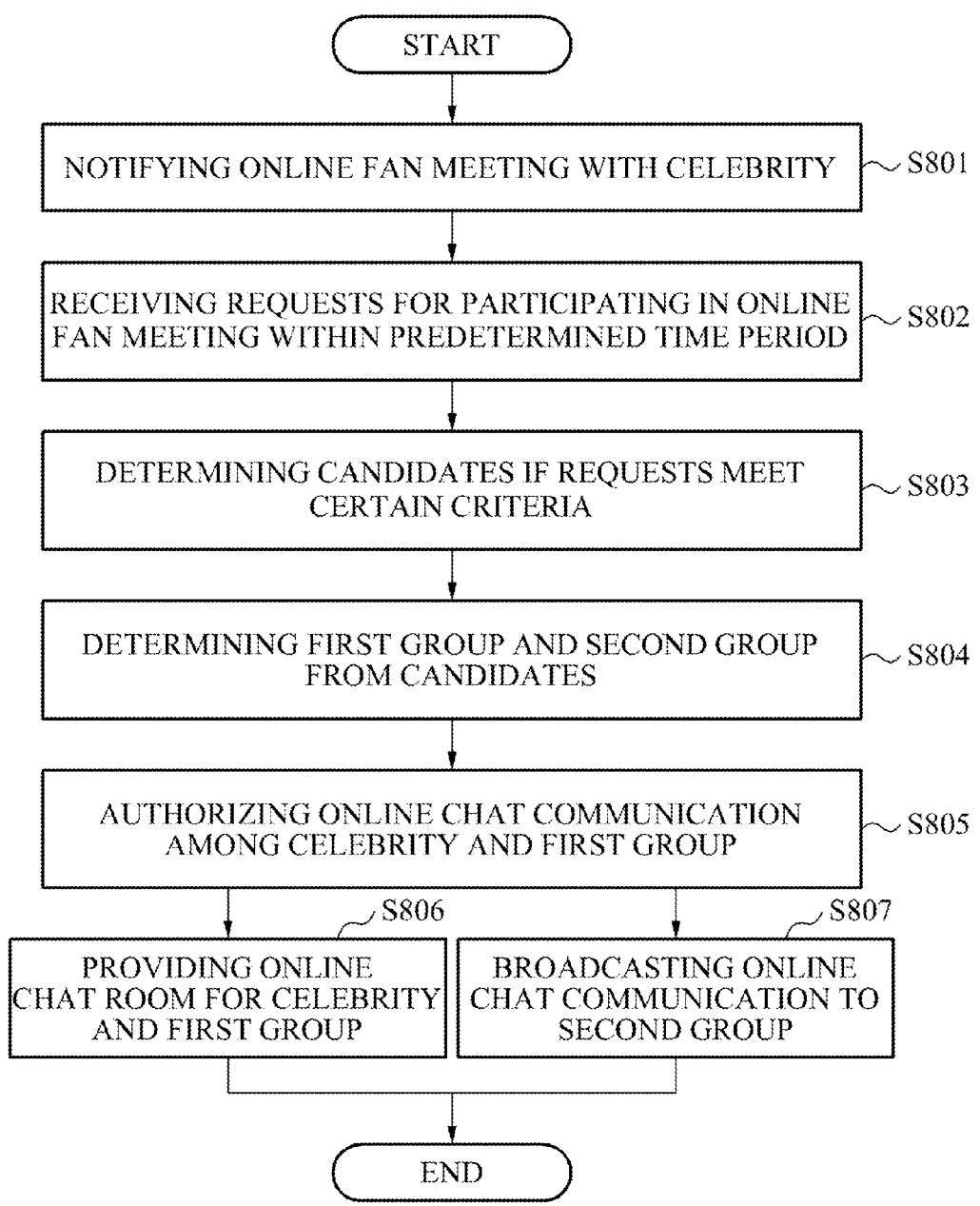
FIG. 8 is a flowchart illustrating a method for providing an online fan meeting according to an exemplary embodiment of the present invention.

FIG. 8 is a flowchart illustrating a method for providing an online fan meeting according to an exemplary embodiment of the present invention. FIG. 8 will be described as if performed by the online chat system shown in FIG. 1 through FIG. 6, but is not limited as such.

Figure 2:
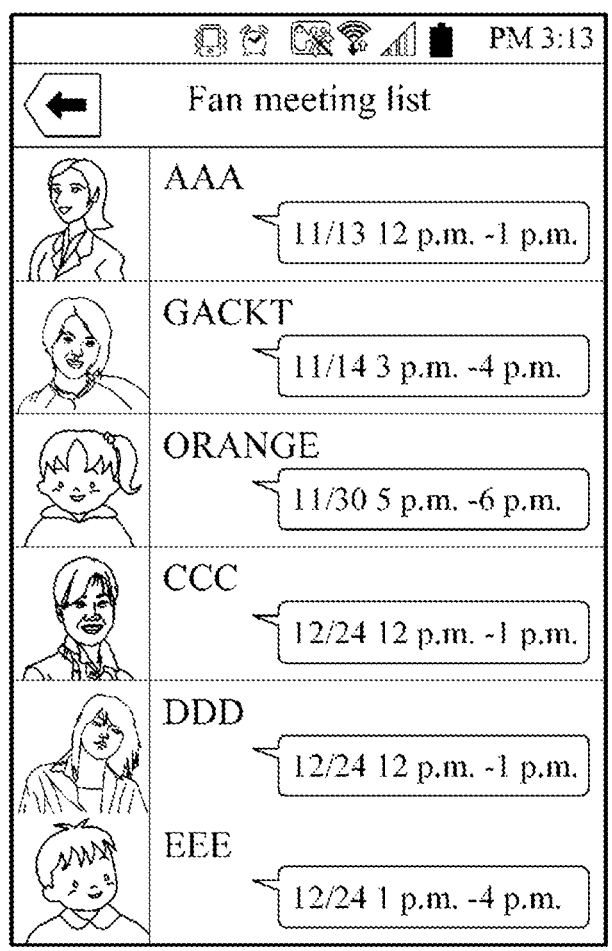
FIG. 2, FIG. 3, FIG. 4, and FIG. 5 are diagrams of application screens illustrating a route for participating in a fan meeting service according to an exemplary embodiment of the present invention.

Referring to FIG. 8, a server module may transmit notifying information about an online fan meeting with a celebrity to terminals having a corresponding client module in operation S801. For example, the notifying information may be displayed in a fan meeting list as shown in FIG. 2, a friend list as shown in FIG. 3, or a pop-up window or balloon shown in FIG. 4. The information may include a time period for applying for the online fan meeting or may include time information for performing the online fan meeting. A user of a terminal having the corresponding client module may transmit a request for participating in the online fan meeting and the server module may receive the requests in operation S802. The server module may set a predetermined time period for receiving the requests. With respect to each celebrity, the number of requests received by the server module and the number of the first group to be determined may be notified in real time. Thus, users may calculate the probability to be selected as the first group for each celebrity.

The server module may determine candidates for the online fan meeting based on the received requests in operation S803. The candidates may be selected based on certain criteria, e.g., demographic information, gender, age, a code, and the like. Further, the candidates may be determined from among users who transmit the requests ("application") in the predetermined period. The server module may notify each applicant whether the applicant is determined as one of the candidates. In operation S804, the server module may select a first group and a second group from the candidates. The second group may be the remaining group of the candidates after selecting the first group. The first group may be granted with a bilateral chat right allowing the first group to transmit and receive messages to and from the celebrity. The second group may be granted with a unilateral chat right to receive messages communicated among the celebrity and the first group.

In operation S805, the server module may authorize an online chat communication among the celebrity and the first group for a time period. Here, the time period may be set in advance. Alternatively, the online chat may continue for as long as the celebrity is willing to participate. In this case, the celebrity can simply end the chat session by closing the chat room window. In operation S806, an online chat room may be provided for temporal communication among the celebrity and the first group. After the expiration of the time period, the first group may be restricted to send data, e.g., messages, photos, video clips, and the like, to the celebrity. In operation S807, the server module may broadcast the online chat communication performed in the online chat room to the second group or the applicants.

The server module 130 may be stored in a storage device of a server (not shown). The server may include one or more processors to execute instructions of the server module. The client module 140 may be installed in a terminal (not shown), e.g., a smartphone, and may be executed by one or more processors included in the terminal.

The methods according to the exemplary embodiments of the present invention may be implemented by program codes, instructions, and/or commands recorded in non-transitory computer-readable media including program instructions to implement various operations embodied by a computer. Particularly, in the embodiments, a program including giving a user a right to participate in a chat with a celebrity and transmitting and receiving a chat message between the celebrity and the user based on the right to participate in the chat may be recorded in non-transitory computer-readable media. For example, in the giving of the right to participate in the chat, users may be divided into a first participant having at least a right to send a message among allowed rights in the chat with the celebrity and a second participant not allowed to have at least the right to send the message. Further, a program including receiving input of a chat participation right of a user to participate in a chat with a celebrity and controlling activation of a function provided by a chat application in the chat with the celebrity based on the chat participation right may be recorded in non-transitory computer-readable media. For example, the user may have at least a right to send a message among allowed rights in the chat with the celebrity or may not have at least the right to send the message.

The programs may include a PC-based program or an exclusive mobile terminal application. The chat application may provide a function of registering fan meeting information, a function of inputting a chat participation intention or a chat participation right, and a function of transmitting and receiving a message and data. Also, the chat application may be configured as an independently operating program or as an in-app ("embedded application") form of a particular application, for example, a messenger program, and be run in the particular application.

The media may also include, alone or in combination with the program instructions, data files, data structures, and the like. The media and program instructions may be those specially designed and constructed for the purposes of the present invention, or they may be of the kind well-known and available to those having skill in the computer software arts. The foregoing file system may be recorded in non-transitory computer-readable media.

As described above, exemplary embodiments of the present invention provide a fan meeting service using an online chat through a messenger, thereby enabling participation of a greater number of people with reduced limitations of places and time for a fan meeting.

According to exemplary embodiments of the present invention, part of fan meeting participants may not be allowed to send a message, thus not only accommodating more fans in an online fan meeting but also securing smooth chat management and a chat speed and improving free participation and openness of the fan meeting.

According to exemplary embodiments of the present invention, an update of a message read count may be controlled for a group chat in an online chat for a fan meeting, thus a system load may be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An online chat method that uses a processor to provide an online communication among a first user terminal and a plurality of second user terminals, the method comprising:
   granting, using the processor, a bilateral chat right to a first group of user terminals selected from the second user terminals for participating in an online chat with the first user terminal;
   authorizing an online chat communication among the first user terminal and the first group of user terminals based on the bilateral chat right;
   establishing the online chat communication;
   broadcasting the online chat communication to a second group of user terminals selected from the second user terminals, the second group of user terminals being granted with a unilateral chat right;
   receiving a first chat message from the first user terminal and a second chat message from a user terminal among the first group of user terminals;
   transmitting the first chat message to the first group of user terminals and the second group of user terminals and transmitting the second chat message to the first user terminal and the second group of user terminals;
   providing a message check count for the first chat message and the second chat message including,
      determining, in real time, a number of user terminals reading the first chat message or the second chat message among the first user terminal and the first group of user terminals,
      determining, in real time, a current session count, and
      updating and transmitting the message check count to the first user terminal and the first group of user terminals if a ratio of the number of user terminals to the current session count is higher than or equal to a threshold level.

2. The online chat method of claim 1, further comprising:
   transmitting information about the online chat communication with the first user terminal to the second user terminals, the information comprising a time period for the online chat communication;
   receiving requests for the online chat communication with the first user terminal from the second user terminals;
   selecting the first group of user terminals from among the second user terminals based on one or more selection criteria; and
   providing an online chat room for temporal communication among the first user terminal and the first group of user terminals, the first user terminal and the first group of user terminals being granted with the bilateral chat right to send and receive messages in the online chat room.

3. The online chat method of claim 2, wherein the temporal communication among the first user terminal and the first group of user terminals is configured to be available during a desired time period.

4. The online chat method of claim 1, wherein the second group of user terminals corresponds to the remaining user terminals of the second user terminals after selecting the first group of user terminals from the second user terminals.

5. The online chat method of claim 1, wherein the unilateral chat right corresponds to a right to receive messages communicated among the first user terminal and the first group of user terminals, the second group of user terminals being prohibited from sending messages to the first user terminal and the first group of user terminals.

6. The online chat method of claim 1, further comprising:
determining a desired number of user terminals as the first group of user terminals from among the second user terminals based on a random selection or a first-come, first-served basis.

7. The online chat method of claim 1, further comprising:
determining one or more user terminals satisfying a set condition as the first group of user terminals from among the second user terminals.

8. The online chat method of claim 1, further comprising:
receiving a request to participate as a member of the first group of user terminals or a request to participate as a member of the second group of user terminals from the second user terminals; and
determining the first group of user terminals and the second group of user terminals based on the requests received from the second user terminals.

9. The online chat method of claim 1, further comprising:
authorizing terminals of the first group of user terminals to send messages to the first user terminal by sending an identifier.

10. The online chat method of claim 1, wherein the providing of the message check count comprises verifying the message check count for the first user terminal and the first group of user terminals without considering the second group of user terminals.

11. The online chat method of claim 1, further comprising:
determining identification of the first user terminal; and
granting a bilateral chat right to the first user terminal if the identification of the first user terminal is authenticated.

12. An online chat system to provide an online chat communication among a first user terminal and a plurality of second user terminals, the system comprising:
a storage device;
a server module stored on the storage device and configured to cause a server to grant a bilateral chat right to a first group of user terminals selected from the second user terminals for participating in an online chat with the first user terminal, and configured to authorize and establish an online chat communication among the first user terminal and the first group of user terminals based on the bilateral chat right,
the server module including,
a message receiver configured to cause the server to receive chat messages from the first user terminal and the first group of user terminals, the message receiver configured to cause the server to receive a first chat message from the first user terminal and to receive a second chat message from a user terminal among the first group of user terminals, and
a message broadcaster configured to cause the server to transmit the chat messages to a second group of user terminals selected from the second user terminals, the second group of user terminals being granted with a unilateral chat right, the message broadcaster configured to cause the server to transmit the first chat message to the first group of user terminals and the second group of user terminals and to cause the server to transmit the second chat message to the first user terminal and the second group of user terminals,
wherein the message receiver is further configured to cause the server to provide a message check count for the first chat message and the second chat message, and
wherein the message receiver is further configured to cause the server to determine a number of user terminals reading the first chat message or the second chat message among the first user terminal and the first group of second user terminals and a current session count in real time, and to update the message check count if a ratio of the number of user terminals to the current session count is higher than or equal to a preset level.

13. The online chat system of claim 12, wherein the server module is further configured to determine a desired number of user terminals as the first group of user terminals from among the second user terminals and the remaining user terminals of the second user terminals as the second group of user terminals based on a random selection or a first-come, first-served basis.

14. The online chat system of claim 12, wherein the server module is further configured to determine one or more user terminals satisfying a set condition as the first group of user terminals from among the second user terminals and the remaining user terminals of the second user terminals as the second group of user terminals.

15. The online chat system of claim 12, wherein the server module is further configured to receive a request to participate as a member of the first group of user terminals or a request to participate as a member of the second group of user terminals from the second user terminals, and configured to determine the first group of user terminals and the second group of user terminals based on the requests received from the second user terminals.

16. The online chat system of claim 12, wherein the server module is further configured to authorize terminals of the first group of user terminals to send messages to the first user terminal by sending an identifier.

17. The online chat system of claim 12, wherein the message receiver is further configured to verify a message check count for the first user terminal and the first group of user terminals without considering the second group of user terminals.

18. A method that uses a processor to participate in an online chat communication with a first user terminal, the method comprising:
transmitting, from a plurality of second user terminals, a request for participating in an online chat communication with the first user terminal to the processor;
receiving, at a selected one of the second user terminals, a chat participation right for the online chat communication in response to the request;
establishing, using the processor, a bilateral chat communication or a unilateral chat communication between the first user terminal and at least one of the second user terminals based on a type of the chat participation right;
executing an online chat application;
activating a message sending function of the online chat application to send a message to the first user terminal if the type of the chat participation right corresponds to a bilateral chat right, the bilateral chat right comprising a right to send and receive messages to and from the first user terminal;

determining a number of user terminals reading the chat messages among the first user terminal and the second user terminals;

determining, in real time, a current session count; and updating a message check count if a ratio of the number of user terminals to the current session count is higher than or equal to a preset level.

19. The method of claim 18, further comprising:

receiving notification information for notifying the online chat communication with the first user terminal, the notification information comprising time information for performing the online chat communication and/or the notification information being associated with a time period for receiving the request.

20. The method of claim 18, further comprising:

displaying a number of applicants applied for the online chat communication with the first user terminal and a desired number of a first group of user terminals selected from among the applicants, the first group of user terminals being authorized for the bilateral chat communication; and displaying information of the first group of user terminals comprising profiles of the first group of user terminals and messages sent by the first group of user terminals.

21. The method of claim 18, wherein the bilateral chat communication is configured to be available during a desired time period, and the bilateral chat communication comprises at least one of a text message sending function, an image sending function, a voice call function, and a video call function.

22. The method of claim 18, further comprising:

transmitting a request to participate in the bilateral chat communication or a request to participate in the unilateral chat communication, the unilateral chat communication being prohibited from sending messages to the first user terminal.

23. A non-transitory computer-readable recording medium comprising an executable program for instructing a computer, when executed by the computer, to perform the method of claim 18.

* * * * *